US011836351B2

(12) United States Patent
Quinones Sepulveda et al.

(10) Patent No.: US 11,836,351 B2
(45) Date of Patent: Dec. 5, 2023

(54) CAUSING A STORAGE DEVICE TO SWITCH STORAGE TIERS BASED ON A WEAR LEVEL

(71) Applicant: Lenovo Global Technology (United States) Inc., Morrisville, NC (US)

(72) Inventors: Luis Rene Quinones Sepulveda, Raleigh, NC (US); Paul Klustaitis, Cary, NC (US); Israel Silva Dias, Apex, NC (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 132 days.

(21) Appl. No.: 17/710,513

(22) Filed: Mar. 31, 2022

(65) Prior Publication Data

US 2023/0315300 A1 Oct. 5, 2023

(51) Int. Cl.
*G06F 3/06* (2006.01)

(52) U.S. Cl.
CPC .......... *G06F 3/0616* (2013.01); *G06F 3/0635* (2013.01); *G06F 3/0685* (2013.01)

(58) Field of Classification Search
None
See application file for complete search history.

(56) References Cited

U.S. PATENT DOCUMENTS 9,135,160 B1 * 9/2015 Zheng .................... G06F 3/0616
2011/0029715 A1 * 2/2011 Hu ........................ G11C 16/349 711/170
2013/0282967 A1 * 10/2013 Ramanujan ......... G06F 12/0246 711/114
2013/0326148 A1 * 12/2013 Fang ................... G06F 12/0246 711/E12.07
2016/0092352 A1 * 3/2016 Camp ..................... G06F 3/067 711/103
2020/0034075 A1 * 1/2020 Li ......................... G06F 3/0644
2020/0110544 A1 * 4/2020 Zhu ........................ G06F 3/0679
2022/0244877 A1 * 8/2022 Chen ..................... G06F 3/0616

* cited by examiner

*Primary Examiner* — Tracy C Chan
(74) *Attorney, Agent, or Firm* — Jeffrey L. Streets

(57) ABSTRACT

A method and a computer program product executed by a processor may include or perform various operations. The operations include periodically reading a wear level for each of a plurality of storage devices operating in a multi-tiered storage system which includes a first storage tier and a second storage tier that is a lower tier than the first storage tier. At least one storage device operates in the first storage tier and at least one storage device operates in the second storage tier. The operations further include identifying a first storage device of the plurality of storage devices that is operating in the first storage tier and has a wear level that is higher than an average wear level for the plurality of storage devices. The operations additionally include causing the first storage device to switch from operating in the first storage tier to operating in the second storage tier.

20 Claims, 5 Drawing Sheets

110

Periodically reading a wear level for each of a plurality of data storage devices, wherein the plurality of data storage devices operate in a multi-tiered storage system include a first storage tier and a second storage tier that is a lower tier than the first storage tier, and wherein at least one of the data storage devices operates in the first storage tier and at least one of the data storage devices operates in the second storage tier — 112

Identifying a first data storage device of the plurality of data storage devices that is operating in the first storage tier and has a wear level that is higher than an average wear level for the plurality of data storage devices — 114

Causing the first data storage device to switch from operating in the first storage tier to operating in the second storage tier — 116

CAUSING A STORAGE DEVICE TO SWITCH STORAGE TIERS BASED ON A WEAR LEVEL

BACKGROUND

The present disclosure relates to methods and systems for managing an amount of wear on a data storage device.

BACKGROUND OF THE RELATED ART

Computers and computing systems need the ability to store and retrieve digital data. Data storage devices having computer interfaces and data storage media can meet this need. Accordingly, a computer may write data to the data storage media of the data storage device and later read the same data from the data storage media. The data storage medium may also store computer software that, when executed by a processor of the computer, causes the computer to perform useful operations. In fact, data storage devices are critical to many important capabilities of a computer or computing system.

Data storage devices are available in many different forms containing many different types of storage media. These data storage devices may vary widely in their performance characteristics, such as latency, input/output operations per second (IOPS), and bandwidth. However, for any specific implementation, other practical considerations may also favor one data storage device over another, including form factor, durability, power consumption and cost.

One common example of a data storage device is a hard disk drive (HDD) that includes an electromechanical data storage device containing a rotating platter coated with magnetic material. Magnetic heads on an actuator arm are controllably positioned over the surface of the rotating platter to store digital data at various locations on the surface of the magnetic material. Hard disk drives are referred to as "non-volatile storage" because the stored data is retained even when power has been turned off. Hard disk drives are available in many different form factors, storage capacities, and performance characteristics. One relevant performance characteristic is the time to access the data since this is a function of the mechanical nature of the rotating platter(s) and the moving actuator arm(s) with magnetic heads. A platter that rotates at a higher rotational speed may have reduced amount of rotational latency and potentially results in a higher data transfer rate. Other design characteristics of a hard drive will also impact its performance characteristics.

Another important example of a data storage device is a solid-state drive (SSD) that stores data in integrated circuit assemblies, such as flash memory. One type of flash memory, referred to as NAND flash, includes floating-gate transistors connected in a manner to form NAND (NOT-AND) logic gates. The memory cells in NAND flash memory are arranged in a rectangular array with each memory cell being electronically addressable via a connection to a word line and a bit line. Accordingly, NAND flash has no moving parts and may read data up to 10 times faster than a HDD and write data up to 20 times faster than a HDD. However, while NAND flash has some performance characteristics that exceed those of a HDD, NAND flash also has durability limitations since each memory cell has some limited number of program-erase (P/E) cycles that it can withstand before wear deteriorates the integrity of the data stored in the memory cell.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations include periodically reading a wear level for each of a plurality of data storage devices, wherein the plurality of data storage devices operate in a multi-tiered storage system include a first storage tier and a second storage tier that is a lower tier than the first storage tier, and wherein at least one of the data storage devices operates in the first storage tier and at least one of the data storage devices operates in the second storage tier. The operations further include identifying a first data storage device of the plurality of data storage devices that is operating in the first storage tier and has a wear level that is higher than an average wear level for the plurality of data storage devices. The operations additionally include causing the first data storage device to switch from operating in the first storage tier to operating in the second storage tier.

DETAILED DESCRIPTION

Figure 1:
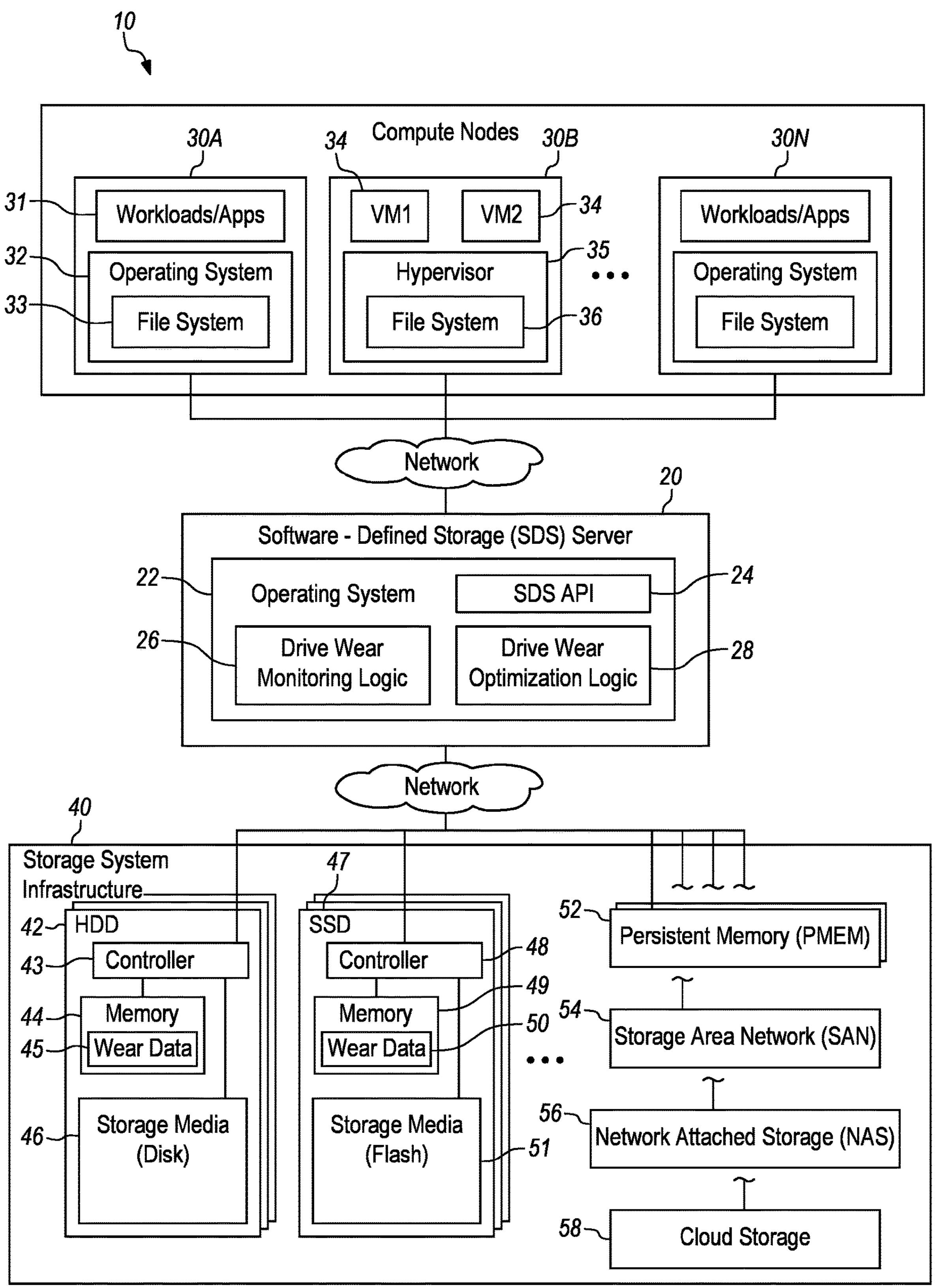
FIG. 1 is a diagram of a computing system including a software-defined storage subsystem in the form of a software-defined storage (SDS) server.

Some embodiments provide a computer program product comprising a non-volatile computer readable medium and non-transitory program instructions embodied therein, the program instructions being configured to be executable by a processor to cause the processor to perform various operations. The operations include periodically reading a wear level for each of a plurality of data storage devices, wherein the plurality of data storage devices operate in a multi-tiered storage system include a first storage tier and a second storage tier that is a lower tier than the first storage tier, and wherein at least one of the data storage devices operates in the first storage tier and at least one of the data storage devices operates in the second storage tier. The operations further include identifying a first data storage device of the plurality of data storage devices that is operating in the first storage tier and has a wear level that is higher than an average wear level for the plurality of data storage devices. The operations additionally include causing the first data storage device to switch from operating in the first storage tier to operating in the second storage tier.

The plurality of data storage devices may include hard disk drives (HDD), solid state drives (SSD), persistent memory (PMEM) devices, cloud storage, optical media, and/or tape storage. Any type of data storage device may be included. However, the term "data storage devices", as used herein, excludes processor registers, processor cache and random-access memory (RAM) which are important forms of computer memory but are not intended to form a data storage device.

The term "storage tiering" refers to systems or methods that store data on various types of data storage devices that are divided into "tiers" based on a one or more performance characteristics of the storage media, such as data availability. Data storage devices with higher performance, such as SSDs, may form a higher tier than other data storage devices with lower performance, such as HDDs. Typically, a higher tier is denoted with a lower tier number, such that tier 1 or even tier 0 may be the higher tier having higher performance. Accordingly, storage tiers with varying degrees or differences in performance or performance characteristics may be denoted with a high tier number, such as tier 2 through tier 5 in some data storage systems. For example, a system having 3 storage tiers may have a first tier ("Tier 1") with highest performance including a plurality of SSDs, a second tier ("Tier 2") with mid-level performance including a plurality of HDDs, and a third tier ("Tier 3") including one or more tape drives. Additional tiers could be easily added to the storage system, such as by including cloud storage in the third tier ("Tier 3") and creating a fourth tier ("Tier 4") that includes the tapes drives. Variations of storage tiering can be envisioned, including a simple two-tier storage system, including primarily SSDs forming a first, top tier ("Tier 1" or simply the "Hot Storage Tier") and HDDs and tape drives forming a second, bottom tier ("Tier 2" or simply the "Cold Storage Tier"). For example, an input/output frequency of the second (cold) storage tier may be lower that an input/output frequency of the first (hot) storage tier. Of course, these are non-limiting examples provided for the purpose of illustration. Storage tiering may be implemented with greater or fewer tiers including any known types of data storage devices having various performance characteristics.

In order to implement storage tiering, the data to be stored in a multi-tiered data storage system must be classified to determine which storage tier should be used to store the data. Some non-limiting examples of factors that may be considered in determined a data classification may include whether the data is I/O intensive (i.e., data used by high-performance operating systems or database files), whether the data is mission-critical (i.e., data used in revenue generating or customer facing applications, such as online transaction processing, reservation systems, and point-of-sale), and/or whether the data is archival (i.e., data used as an archive or backup, aging email messages, tax or compliance records). Furthermore, data may be reclassifying as it ages.

Data storage devices, such as HDDs and SSDs, include a local controller that monitors a wear level of the storage media within the data storage device. Accordingly, the wear level of the storage media may be obtained from the controller. In some embodiments, a software-defined storage (SDS) system, operating system that includes software-defined storage functionality, or a hypervisor of a hyper-converged computing system, may obtain the wear level of a data storage device by interfacing with the data storage device and reading the wear level data. In a non-limiting example, the wear level for each of a plurality of data storage devices may be read by an operating system of a software-defined storage (SDS) system.

In some embodiments, causing the first data storage device to switch from operating in the first storage tier to operating in the second storage tier may have the effect of reducing a rate of read and/or write operations to the first data storage device. Accordingly, the reduced rate of wear on the first data storage device may prevent the wear level of the first data storage device from exceeding a predetermined wear indicator or wear expectancy prior to reaching a predetermined life expectancy. For example, the predetermined wear indicator and/or the predetermined life expectancy may be established by the manufacturer of the first data storage device, perhaps accompanied by a warranty up to the predetermined wear indicator and life expectancy. Optionally, the first data storage device may also be caused to operate as a hot spare for other data storage device in the first storage tier. Accordingly, a portion of the first data storage device may be temporarily operated as a hot spare to the first storage tier, wherein a heavy load on the first storage tier may cause any available capacity of the first data storage device to be used in support of the first storage tier.

In some embodiments, the operations may further include determining a first average wear rate for the at least one of the data storage devices that operates in the first storage tier and determining a second average wear rate for the at least one of the data storage devices that operates in the second storage tier. Sill further, the operations may include identifying a predetermined life expectancy for the first data storage device and a predetermined wear expectancy for the first data storage device. Accordingly, the first data storage device may be caused to switch from operating in the first storage tier to operating in the second storage tier at a time before the second average wear rate would cause the wear level of the first data storage device to reach the predetermined wear expectancy of the first data storage device prior to the first data storage device reaching the predetermined life expectancy. In other words, knowledge of the average wear rates in the first and second storage tiers may, along with the wear level and predetermined wear expectancy and life expectancy of the first data storage device, enable the first data storage device to be switched from the first storage tier to the second storage tier at a time during the life of the first data storage device so that the first data storage device can avoid exceeding its wear expectancy before it exceeds its life expectancy. It should be recognized that switching or moving the first data storage device from one storage tier to another storage tier, such as from a first (higher) storage tier to a second (lower) storage tier, may also require data migration from the first data storage device to another data storage device in the first storage tier. For example, embodiments may include identifying a second data storage device of the plurality of data storage devices that is operating in the first storage tier and has a wear level that is lower than the average wear level for the plurality of data storage devices and moving data from the first data storage device to the second storage device. Furthermore, once the first data storage device has been switched to the second storage tier, the first data storage device may receive and store data from a different data classification, such as archive data, and/or be partially or fully allocating to empty capacity.

In some embodiments, switching of the first data storage device from the first storage tier to the second storage tier may be caused in response to one or more further conditions. For example, it may be desirable to prevent frequent switching of a data storage device from one storage tier to another storage tier since there are associated costs or penalties of have fewer data storage devices remaining in one of the storage tiers, such as the first storage tier, and the load of migrating data from one data storage device to another data storage device. In one option, the operations may further include determining a first average wear rate for the at least one of the data storage devices that operates in the first storage tier, determining a second average wear rate for the at least one of the data storage devices that operates in the second storage tier, and identifying a predetermined life expectancy for the first data storage device and a predetermined wear expectancy for the first data storage device. The first data storage device may then be caused to switch from operating in the first storage tier to operating in the second storage tier in response to the dual conditions of (1) determining that a wear level of the first data storage device would reach the predetermined wear expectancy of the first data storage device prior to the first data storage device reaching the predetermined life expectancy if the first data storage device continues to operate in the first storage tier at the first average wear rate, and (2) determining that a wear level of the first data storage device would reach at least a predetermine setpoint wear level but not exceed the predetermined wear expectancy of the first data storage device prior to the first data storage device reaching the predetermined life expectancy if the first data storage device were to operate in the second storage tier at the second average wear rate.

Some embodiments provide a method including various operations that can be performed in a computing system, including a multi-tier storage system. The operations include periodically reading a wear level for each of a plurality of data storage devices, wherein the plurality of data storage devices operate in a multi-tiered storage system include a first storage tier and a second storage tier that is a lower tier than the first storage tier, and wherein at least one of the data storage devices operates in the first storage tier and at least one of the data storage devices operates in the second storage tier. The operations further include identifying a first data storage device of the plurality of data storage devices that is operating in the first storage tier and has a wear level that is higher than an average wear level for the plurality of data storage devices. The operations additionally include causing the first data storage device to switch from operating in the first storage tier to operating in the second storage tier.

The method embodiments may further include any one or more operation or other aspect of the computer program products disclosed herein. Therefore, the foregoing description of the operations in the context of a computer program product will not be repeated here in the context of a method, such as a computer-implemented method or method of software-defined storage. Similarly, embodiments may be directed to a software-defined storage system, such as a software-defined storage (SDS) server, that includes a process unit capable of performing any of the disclosed operations.

FIG. 1 is a diagram of a computing system 10 including a software-defined storage subsystem in the form of a software-defined storage (SDS) server 20. The software-defined storage (SDS) server 20 runs an operating system 22 that include a software-defined storage (SDS) application programming interface (API) 24, drive wear monitoring logic 26, and drive wear optimization logic 28. The software-defined storage (SDS) application programming interface (API) 24 enables a client system, such as one of the compute nodes 30A-N, to access and use SDS functions of the SDS operating system 22. Specifically, workloads or applications 31 on compute node 30A may use the file system 33 provided by the operating system 32 to interface with the SDS API 24. Similarly, virtual machines 34 on compute node 30B may use the file system 36 provided by the hypervisor 35 to interface with the SDS API 24.

The drive wear monitoring logic 26 may monitor a wear level for each of the data storage devices in the storage system infrastructure 40. For example, the drive wear monitoring logic 26 may periodically read a wear level of one or more of the data storage devices including the hard disk drive (HDD) 42, solid-state drive (SSD) 47, persistent memory (PMEM) 52. The drive wear monitoring logic 26 may also be able to monitor and read a wear level for the individual data storage devices within a storage area network (SAN) 54 or network-attached storage (NAS) 56. The system may further include, or have access to, cloud storage 58.

As shown, the HDDs 42 each include a controller 43, memory 44 storing wear level data 45 for the HDD, and the storage media (disk) 46. Similarly, the SSDs 47 each include a controller 48, memory 49 storing wear level data 50 for the HDD, and the storage media (flash) 51. Accordingly, the drive wear monitoring logic 26 may interfaces with the respective controllers 43, 48 of the individual HDDs 42 and individual SSDs 47 to read their wear levels.

The plurality of data storage devices in the storage system 40 may be operated in a manner to implement a multi-tiered storage system. For example, the storage system 40 may define a first storage tier and a second storage tier that is a lower tier than the first storage tier. At least one of the data storage devices, such as each of the SSDs 47, may operate in the first (hot) storage tier and at least another one of the data storage devices, such as each of the HDDs 42, may operate in the second (cold) storage tier. It should be recognized that other data storage devices in the storage system 40 may be included the hot or cold storage tiers and/or form a further storage tier. For example, the SSDs 47 may be included in a first storage tier ("Tier 1"), the HDDs 42 may be included in a second storage tier ("Tier 2"), and cloud storage 58 may be include in a third storage tier ("Tier 3").

The drive wear optimization logic 28 may utilize the wear levels obtained by the drive wear monitoring logic 26 to support determinations about actions, and the timing of those actions, to reduce a rate of wear on one or more of the data storage devices. Specifically, the drive wear optimization logic 28 may cause a first data storage device (i.e., one of the SSDs) to switch from operating in the first storage tier to operating in the second storage tier in response to the first data storage device of the plurality of data storage devices being identified as operating in the first storage tier and having a wear level that is higher than an average wear level for the plurality of data storage devices.

Figure 2:
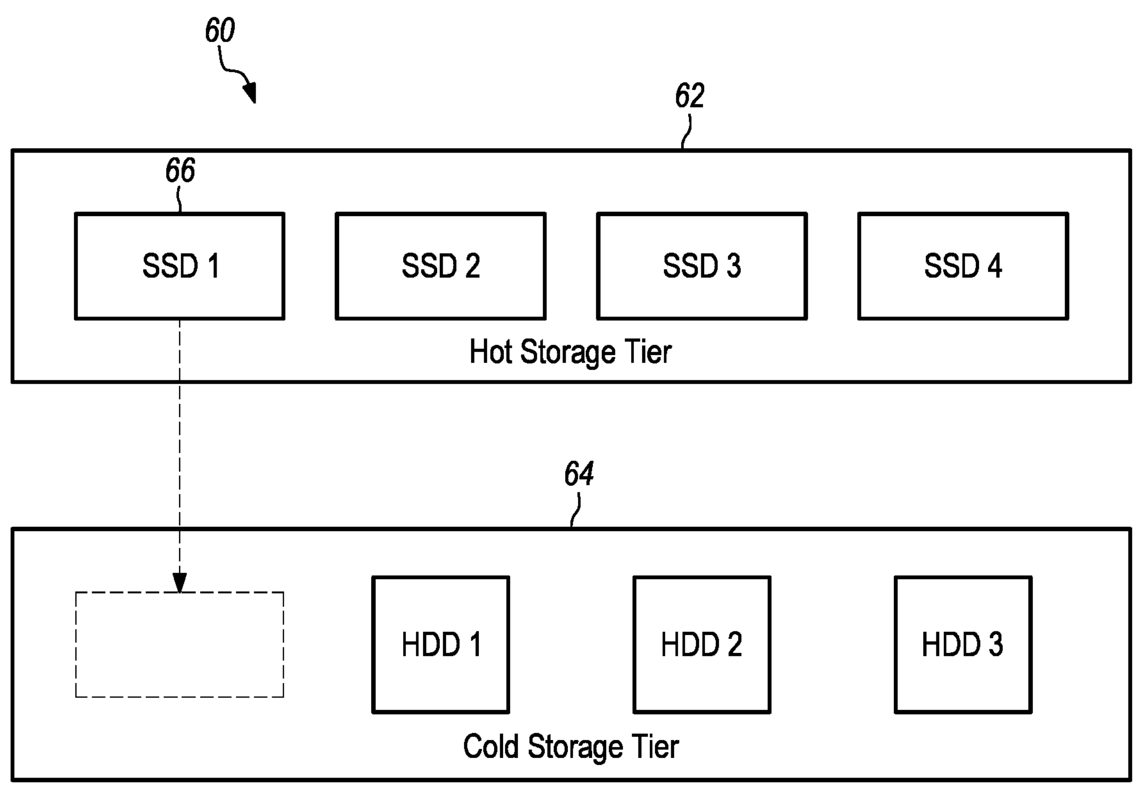
FIG. 2 is a schematic diagram illustrating a multi-tiered storage system formed with four solid-state drives (SSDs) and three hard disk drives (HDDs).

FIG. 2 is a schematic diagram illustrating a multi-tiered storage system 60 formed with four SSDs 47 and three HDDs 42 consistent with FIG. 1. The storage system 60 define a hot storage tier and a cold storage tier 62. Initially, each of the SSDs 47 are assigned to, and operate in, the hot storage tier 62 and each of the HDDs 42 are assigned to, and operate in, the cold storage tier. However, at some point, the drive wear optimization logic 28 (shown in FIG. 1) causes SSD1 66 to switch from operating in the hot storage tier 62 to operating in the cold storage tier 64 in response to SSD1 66 having a wear level that is higher than an average wear level for the four SSDs (SSD1-SSD4). Subsequently, SSD1 66 will be operated in the cold storage tier 64 where the average wear rate is less than in the hot storage tier 62.

Figure 3:
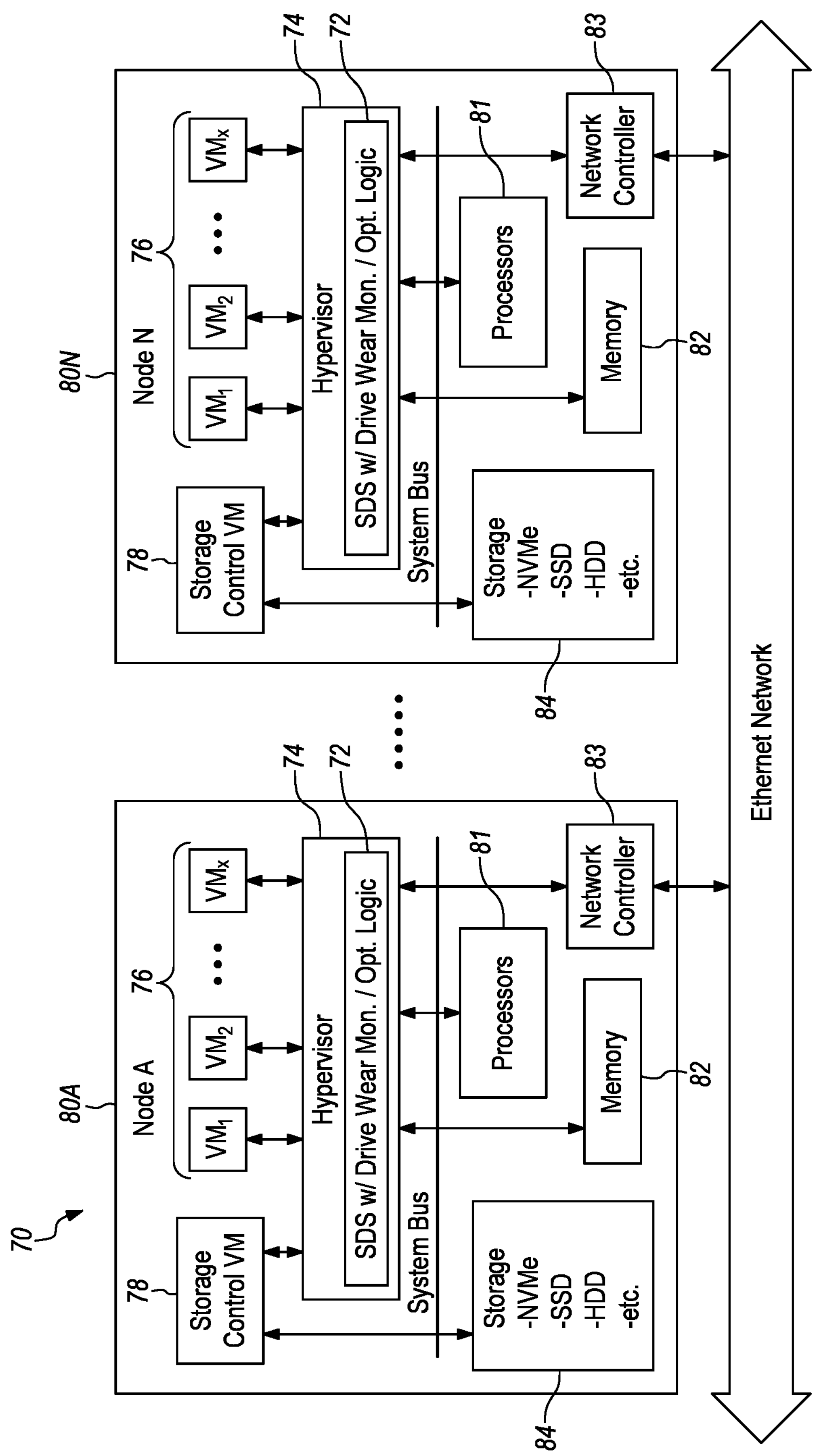
FIG. 3 is a diagram of a computing system having a hyper-converged infrastructure, where a software-defined storage (SDS) module including the drive wear monitoring and optimization logic is included in the hypervisor that runs on the nodes of the system.

FIG. 3 is a diagram of a computing system 70 having a hyper-converged infrastructure, where a software-defined storage (SDS) module 72 including the drive wear monitoring and optimization logic is included in the hypervisor 74 that runs on the nodes 80A-80N of the computing system 70. Each of the nodes 80A-80N may include one or more processors 81, memory 82, a network controller 83, and a storage system 84. Accordingly, each of the nodes 80A-80N may run the hypervisor 74 to support a varying number of virtual machines 76 ($VM_1$-$VM_x$). In one option, the hypervisor 74 may run the software-defined storage (SDS) module 72 including the drive wear monitoring and optimization logic ("SDS w/ Drive Wear Mon./Opt. Logic") to monitor the wear level of various data storage devices (i.e., NVMe, SSDs, HHDs, etc.) in the storage system 84 and causing a first data storage device to switch from operating in a first storage tier to operating in a second storage tier that is lower than the first storage tier in response to the first data storage device having a wear level that is higher than an average wear level for the other data storage devices in the first storage tier. Alternatively, the software-defined storage (SDS) module 72 may be run in an optional storage control virtual machine 78.

Figure 4:
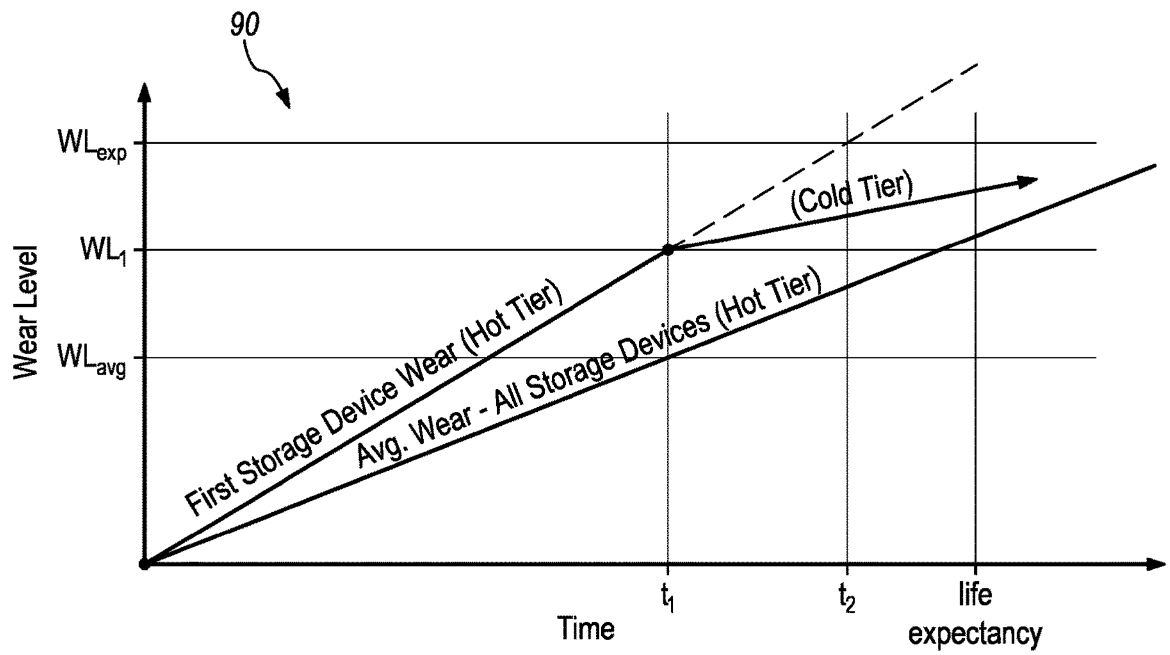
FIG. 4 is a graph of wear level over time for a first storage device in accordance with some embodiments.

FIG. 4 is a graph 90 of wear level over time for a first storage device in accordance with some embodiments. As shown, the first data storage device has been operating in a hot tier and at a first time ($t_1$) the wear level ($WL_1$) is determined to be greater than the average wear level ($WL_{avg}$). Accordingly, the first data storage device is caused to switch from operating in the hot storage tier (prior to time $t_1$) to operating in the cold storage tier (after time $t_1$). As a result of operating in the cold storage tier, the wear rate on the first data storage device is reduced (note the reduced slope of the wear level for the first data storage device). Furthermore, it is shown that the wear level of the first data storage device would have (see dashed line) exceeded the wear level expectancy ($WL_{exp}$) at a second time ($t_2$), which is prior to the life expectancy for the first data storage device, if the first data storage device had continued operation in the hot tier. By operating in the cold tier after time $t_1$, the first data storage device is able to reach its life expectancy without exceeding it wear level expectancy.

Figure 5:
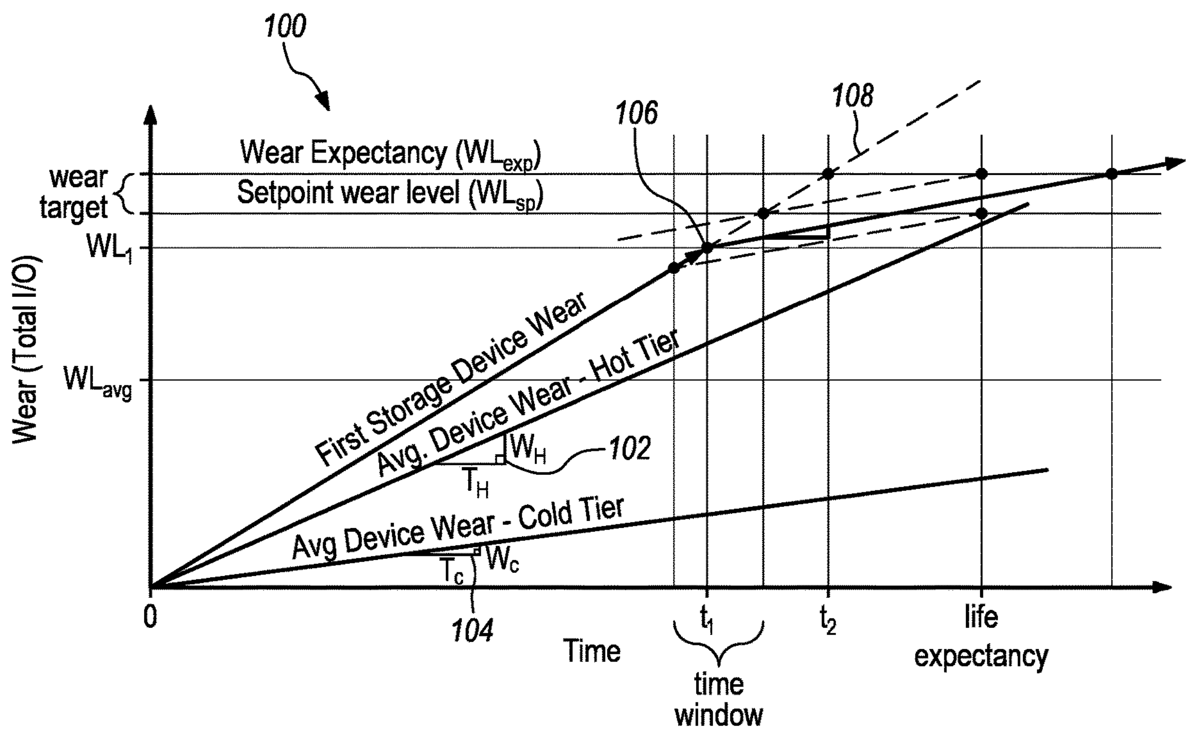
FIG. 5 is a graph of wear level over time for a first storage device in accordance with another embodiment.

FIG. 5 is a graph 100 of wear level over time for the first storage device in accordance with another embodiment. Graph 100 is similar to graph 90 of FIG. 4, except that the drive wear optimization logic 28 (see FIG. 1) has established a wear target window for the first storage device. Specifically, the wear target window is bounded by the wear level expectancy ($WL_{exp}$) and a predetermined (minimum) wear level setpoint ($WL_{sp}$). In order to cause the first data storage device to have a wear level greater than the wear level setpoint ($WL_{sp}$) and less than the wear level expectancy ($WL_{exp}$) at the point the first data storage device reaches its life expectancy, the drive wear optimization logic 28 needs to have access to (1) an average wear rate for the devices in the hot storage tier (see the illustrated slope 102), (2) an average wear rate for the devices in the cold storage tier (see the illustrated slope 104), (3) the predetermined life expectancy ("life expectancy") for the first data storage device, and (4) the predetermined wear expectancy ($WL_{exp}$), and the predetermined wear level setpoint ($WL_{sp}$). Accordingly, the first data storage device may be caused to switch from operating in the first storage tier to operating in the second storage tier in response to: (1) determining that a wear level of the first data storage device would reach the predetermined wear expectancy ($WL_{exp}$) of the first data storage device prior to the first data storage device reaching the predetermined life expectancy ("life expectancy") if the first data storage device continues to operate (dashed line 108) in the first storage tier at the first average wear rate 102, and (2) determining that a wear level of the first data storage device would reach at least a predetermine setpoint wear level ($WL_{sp}$) but not exceed the predetermined wear expectancy ($WL_{exp}$) of the first data storage device prior to the first data storage device reaching the predetermined life expectancy ("life expectancy") if the first data storage device were to operate in the second storage tier at the second average wear rate ("life expectancy") 104. Note that the wear level for the first data storage device is illustrated as if the first data storage device were switched from the hot storage tier to the cold storage tier at point 106 corresponding to the first time ($t_1$), but the switch could have occurred at any point in the "time window" noted on the time axis. Executing the switch from the hot tier to the cold tier during the "time window" is predicted to cause the first storage device to have a wear level within the "wear target" noted on the y-axis when the "life expectancy" is reached. This embodiment and similar embodiments may be utilized to manage the wear level of the storage device in a manner that both prevent excessive wear that may cause premature failure or unreliability of the storage device, while also using at least some predetermined amount of the wear level expectancy for the storage device. This embodiment and similar embodiments may also prevent a storage device from being switched between storage tiers based on some short term spike in the wear level of the storage device.

Figure 6:
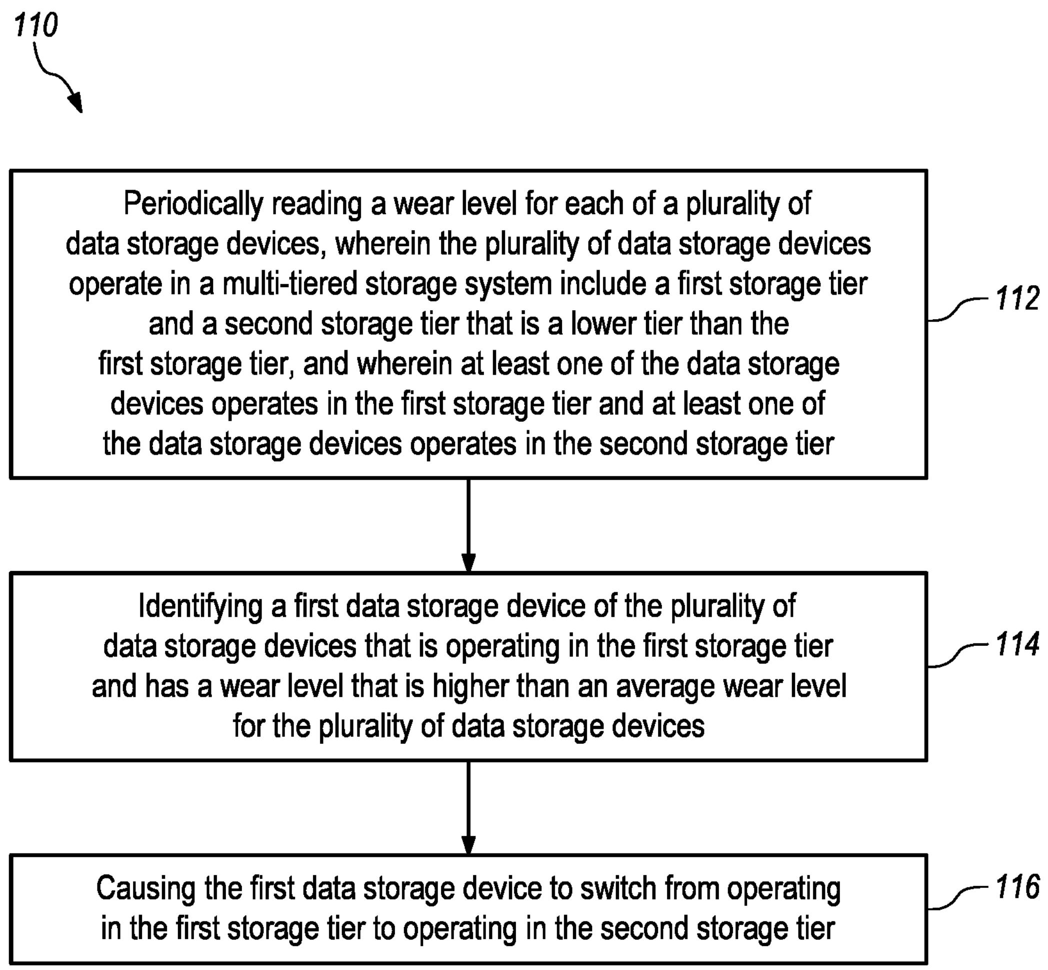
FIG. 6 is a flowchart of operations according to some embodiments.

FIG. 6 is a flowchart of operations 110 according to some embodiments. Operation 112 includes periodically reading a wear level for each of a plurality of data storage devices, wherein the plurality of data storage devices operate in a multi-tiered storage system include a first storage tier and a second storage tier that is a lower tier than the first storage tier, and wherein at least one of the data storage devices operates in the first storage tier and at least one of the data storage devices operates in the second storage tier. Operation 114 includes identifying a first data storage device of the plurality of data storage devices that is operating in the first storage tier and has a wear level that is higher than an average wear level for the plurality of data storage devices. Operation 116 includes causing the first data storage device to switch from operating in the first storage tier to operating in the second storage tier.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:

periodically reading a wear level for each of a plurality of data storage devices, wherein the plurality of data storage devices operate in a multi-tiered storage system include a first storage tier and a second storage tier that is a lower tier than the first storage tier, and wherein at least one of the data storage devices operates in the first storage tier and at least one of the data storage devices operates in the second storage tier;

identifying a first data storage device of the plurality of data storage devices that is operating in the first storage tier and has a wear level that is higher than an average wear level for the plurality of data storage devices; and causing the first data storage device to switch from operating in the first storage tier to operating in the second storage tier.

2. The computer program product of claim 1, wherein the first storage tier is a hot storage tier and the second storage tier is a cold storage tier.

3. The computer program product of claim 1, wherein an input/output frequency of the second storage tier is lower that an input/output frequency of the first storage tier.

4. The computer program product of claim 1, the operations further comprising:

causing the first data storage device to operate as a hot spare for other data storage device in the first storage tier.

5. The computer program product of claim 1, wherein causing the first data storage device to switch from operating in the first storage tier to operating in the second storage tier reduces a rate of read and/or write operations to the first data storage device.

6. The computer program product of claim 1, wherein the plurality of data storage devices include hard disk drives, solid state drives, and/or persistent memory devices.

7. The computer program product of claim 1, wherein the wear level for each of a plurality of data storage devices is read by an operating system of a software-defined storage (SDS) system.

8. The computer program product of claim 1, the operations further comprising:

determining a first average wear rate for the at least one of the data storage devices that operates in the first storage tier;

determining a second average wear rate for the at least one of the data storage devices that operates in the second storage tier; and identifying a predetermined life expectancy for the first data storage device and a predetermined wear expectancy for the first data storage device, wherein the first data storage device is caused to switch from operating in the first storage tier to operating in the second storage tier at a time before the second average wear rate would cause the wear level of the first data storage device to reach the predetermined wear expectancy of the first data storage device prior to the first data storage device reaching the predetermined life expectancy.

9. The computer program product of claim 1, the operations further comprising:

determining a first average wear rate for the at least one of the data storage devices that operates in the first storage tier;

determining a second average wear rate for the at least one of the data storage devices that operates in the second storage tier; and identifying a predetermined life expectancy for the first data storage device and a predetermined wear expectancy for the first data storage device, wherein the first data storage device is caused to switch from operating in the first storage tier to operating in the second storage tier in response to:

determining that a wear level of the first data storage device would reach the predetermined wear expectancy of the first data storage device prior to the first data storage device reaching the predetermined life expectancy if the first data storage device continues to operate in the first storage tier at the first average wear rate; and determining that a wear level of the first data storage device would reach at least a predetermine setpoint wear level but not exceed the predetermined wear expectancy of the first data storage device prior to the first data storage device reaching the predetermined life expectancy if the first data storage device were to operate in the second storage tier at the second average wear rate.

10. The computer program product of claim 1, the operations further comprising:

identifying a second data storage device of the plurality of data storage devices that is operating in the first storage tier and has a wear level that is lower than the average wear level for the plurality of data storage devices; and moving data from the first data storage device to the second storage device and allocating empty capacity to the first data storage device.

11. A method, comprising:

periodically reading a wear level for each of a plurality of data storage devices, wherein the plurality of data storage devices operate in a multi-tiered storage system include a first storage tier and a second storage tier that is a lower tier than the first storage tier, and wherein at least one of the data storage devices operates in the first storage tier and at least one of the data storage devices operates in the second storage tier;

identifying a first data storage device of the plurality of data storage devices that is operating in the first storage tier and has a wear level that is higher than an average wear level for the plurality of data storage devices; and causing the first data storage device to switch from operating in the first storage tier to operating in the second storage tier.

12. The method of claim 11, wherein the first storage tier is a hot storage tier and the second storage tier is a cold storage tier.

13. The method of claim 11, wherein an input/output frequency of the second storage tier is lower that an input/output frequency of the first storage tier.

14. The method of claim 11, the operations further comprising:

causing the first data storage device to operate as a hot spare for other data storage device in the first storage tier.

15. The method of claim 11, wherein causing the first data storage device to switch from operating in the first storage tier to operating in the second storage tier reduces a rate of read and/or write operations to the first data storage device.

16. The method of claim 11, wherein the plurality of data storage devices include hard disk drives, solid state drives, and/or persistent memory devices.

17. The method of claim 11, wherein the wear level for each of a plurality of data storage devices is read by an operating system of a software-defined storage (SDS) system.

18. The method of claim 11, the operations further comprising:

determining a first average wear rate for the at least one of the data storage devices that operates in the first storage tier;

determining a second average wear rate for the at least one of the data storage devices that operates in the second storage tier; and identifying a predetermined life expectancy for the first data storage device and a predetermined wear expectancy for the first data storage device, wherein the first data storage device is caused to switch from operating in the first storage tier to operating in the second storage tier at a time before the second average wear rate would cause the wear level of the first data storage device to reach the predetermined wear expectancy of the first data storage device prior to the first data storage device reaching the predetermined life expectancy.

19. The method of claim 11, the operations further comprising:

determining a first average wear rate for the at least one of the data storage devices that operates in the first storage tier;

determining a second average wear rate for the at least one of the data storage devices that operates in the second storage tier; and identifying a predetermined life expectancy for the first data storage device and a predetermined wear expectancy for the first data storage device, wherein the first data storage device is caused to switch from operating in the first storage tier to operating in the second storage tier in response to:

determining that a wear level of the first data storage device would reach the predetermined wear expectancy of the first data storage device prior to the first data storage device reaching the predetermined life expectancy if the first data storage device continues to operate in the first storage tier at the first average wear rate; and determining that a wear level of the first data storage device would reach at least a predetermine setpoint wear level but not exceed the predetermined wear expectancy of the first data storage device prior to the first data storage device reaching the predetermined life expectancy if the first data storage device were to operate in the second storage tier at the second average wear rate.

20. The method of claim 11, the operations further comprising:

identifying a second data storage device of the plurality of data storage devices that is operating in the first storage tier and has a wear level that is lower than the average wear level for the plurality of data storage devices; and moving data from the first data storage device to the second storage device and allocating empty capacity to the first data storage device.

* * * * *